(12) United States Patent
Dillard et al.

(10) Patent No.: US 10,816,205 B2
(45) Date of Patent: Oct. 27, 2020

(54) THERMALLY ISOLATED COMBUSTOR PRE-DIFFUSER

(71) Applicant: UNITED TECHNOLOGIES CORPORATION, Farmington, CT (US)

(72) Inventors: Gary J Dillard, Brownsboro, AL (US); Russell B Hanson, Jupiter, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 523 days.

(21) Appl. No.: 15/993,520

(22) Filed: May 30, 2018

(65) Prior Publication Data

US 2019/0368737 A1 Dec. 5, 2019

(51) Int. Cl.
  *F23R 3/10* (2006.01)
  *F01D 9/04* (2006.01)
  *F02K 3/06* (2006.01)

(52) U.S. Cl.
  CPC .............. *F23R 3/10* (2013.01); *F01D 9/041* (2013.01); *F02K 3/06* (2013.01); *F05D 2220/32* (2013.01); *F05D 2240/35* (2013.01)

(58) Field of Classification Search
  CPC .............. F23R 3/10; F01D 9/041; F02K 3/06
  See application file for complete search history.

(56) References Cited

U.S. PATENT DOCUMENTS

| 5,609,467 A | 3/1997 | Lenhart et al. |
| 6,401,447 B1 | 6/2002 | Rice et al. |
| 8,561,410 B2* | 10/2013 | Mulcaire .................. G08G 1/01 60/751 |
| 9,664,062 B2 | 5/2017 | Munshi et al. |
| 2014/0286763 A1* | 9/2014 | Munshi ...................... F02C 7/12 415/178 |
| 2014/0290272 A1* | 10/2014 | Mulcaire ................. F01D 25/12 60/806 |
| 2016/0017807 A1 | 1/2016 | Chuong et al. |

FOREIGN PATENT DOCUMENTS

| EP | 2354459 | 8/2011 |
| EP | 3225784 | 10/2017 |

OTHER PUBLICATIONS

European Patent Office, European Search Report dated Oct. 29, 2019 in Application No. 19177436.3.

* cited by examiner

Primary Examiner — Woody A Lee, Jr.
Assistant Examiner — Michael L Sehn
(74) Attorney, Agent, or Firm — Snell & Wilmer, L.L.P.

(57) ABSTRACT

A pre-diffuser fairing for a gas turbine engine is disclosed. In various embodiments, the pre-diffuser fairing includes a first side wall, a first radially inward portion and a first radially outward portion and a second side wall, a second radially inward portion and a second radially outward portion. The first side wall and the second side wall are spaced apart to form a cavity configured to receive a strut.

20 Claims, 7 Drawing Sheets

THERMALLY ISOLATED COMBUSTOR PRE-DIFFUSER

FIELD

The present disclosure relates generally to gas turbine engines and, more particularly, to gas turbine engines having pre-diffuser configurations disposed intermediate the compressor and the combustor sections.

BACKGROUND

Gas turbine engines, such as those used to provide thrust to an aircraft, are internal combustion engines that use air as the working fluid. In general, the gas turbine engines include a fan section and a core engine located downstream of the fan section. The core engine generally includes a compressor section, one or more combustors, and a turbine section. During operation, air is drawn into the fan section and accelerated by rotating fan blades. A fraction of the indrawn air is routed through the core engine, where it is compressed and pressurized by rotating blades of the compressor section before entering the combustor section. In the combustor section, the air is combusted with fuel to generate hot combustion gases. The hot combustion gases expand through and drive the turbine section, which extracts energy from the gases to power the compressor and fan sections. The hot gases are then expelled through an exhaust nozzle.

Prior to entry into the combustor section, the compressed air exiting the compressor section typically has a high temperature and flows at a high velocity. In order to guide the air to the individual combustors, as well as to reduce the velocity of the compressed air and to condition it for combustion, the gas turbine engine may include a diffuser case. In general, the diffuser case may comprise two components, an inner diffuser case and an outer diffuser case. The inner diffuser case typically defines a pre-diffuser section disposed downstream of and proximate to an outlet of the compressor section that defines a diverging passageway for the compressed air exiting the compressor section. The diverging passageway serves to increase the pressure and reduce the velocity of the flow of compressed air exiting the compressor section. As the pre-diffuser section is positioned just downstream of the compressor, it is exposed to the hot, compressed air exiting the compressor section. In some situations, the temperature difference between the hot, compressed air passing through the pre-diffuser section and the cooler air surrounding the inner diffuser case may lead to unequal thermal expansion of the components comprising the pre-diffuser section.

SUMMARY

A pre-diffuser fairing for a gas turbine engine is disclosed. In various embodiments, the pre-diffuser fairing includes a first side wall, a first radially inward portion and a first radially outward portion and a second side wall, a second radially inward portion and a second radially outward portion. The first side wall and the second side wall are spaced apart to form a cavity configured to receive a strut.

In various embodiments, the strut extends in a radial direction between an annular outer wall and an annular inner wall of an inner diffuser case. In various embodiments, the first radially outward portion and the second radially outward portion are configured for positioning at an offset distance from the annular outer wall. In various embodiments, the first side wall and the second side wall define a longitudinal axis and the offset distance is variable along the longitudinal axis.

In various embodiments, the first radially outward portion comprises a first aft end stop configured to abut against an inner diffuser case. In various embodiments, the first aft end stop is configured to abut against a lip extending radially inward from an annular outer wall of the inner diffuser case. In various embodiments, the second radially outward portion comprises a second aft end stop configured to abut against the lip extending radially inward from the annular outer wall of the inner diffuser case. In various embodiments, the first radially outward portion and the second radially outward portion comprise a radially outward lip positioned at a fore end of the pre-diffuser fairing. In various embodiments, the first radially inward portion and the second radially inward portion comprise a radially inward lip positioned at the fore end of the pre-diffuser fairing. In various embodiments, at least one of the radially inward lip and the radially outward lip is configured to engage a compressor section of the gas turbine engine.

A pre-diffuser section for a gas turbine engine is disclosed. In various embodiments, the pre-diffuser section includes an inner diffuser case having an annular outer wall and an annular inner wall positioned radially inward of the annular outer wall and a first pre-diffuser fairing disposed between the annular outer wall and the annular inner wall, the first pre-diffuser fairing including a first portion having a first side wall, a first radially inward plate and a first radially outward plate, and a second portion having a second side wall, a second radially inward plate and a second radially outward plate.

In various embodiments, the inner diffuser case includes a first strut extending radially between the annular outer wall and the annular inner wall and the first side wall and the second side wall are spaced apart to form a cavity configured to receive the first strut. In various embodiments, the first radially outward plate and the second radially outward plate are positioned at an offset distance from the annular outer wall. In various embodiments, the first portion and the second portion define a longitudinal axis and the offset distance is variable along the longitudinal axis.

In various embodiments, the pre-diffuser section includes a second strut positioned adjacent the first strut and a second pre-diffuser fairing positioned adjacent the first pre-diffuser fairing. In various embodiments, the first pre-diffuser fairing and the second pre-diffuser fairing are configured to provide a pre-diffuser passageway extending in a lengthwise direction between the first strut and the second strut. In various embodiments, the first pre-diffuser fairing and the second pre-diffuser fairing are formed as a single component.

In various embodiments, the first portion comprises a first aft end stop configured to abut against the inner diffuser case and the second portion comprises a second aft end stop configured to abut against the inner diffuser case. In various embodiments, the first radially inward plate and the second radially inward plate are positioned radially outward of and in contact with the annular inner wall.

A gas turbine engine is disclosed. In various embodiments, the gas turbine engine includes a compressor; an inner diffuser case positioned axially downstream of the compressor, the inner diffuser case having an annular outer wall, an annular inner wall positioned radially inward of the annular outer wall and a strut extending radially between the annular outer wall and the annular inner wall; and a pre-diffuser fairing disposed between the annular outer wall and the annular inner wall. In various embodiments, the pre-diffuser fairing includes a first portion having a first side wall, a first radially inward plate and a first radially outward plate, and a second portion having a second side wall, a second radially inward plate and a second radially outward plate. In various embodiments, the first side wall and the second side wall are spaced apart to form a cavity configured to receive the strut and the first radially outward plate and the second radially outward plate are positioned at an offset distance from the annular outer wall and configured to provide a first insulating region between the first radially outward plate and the annular outer wall and a second insulating region between the second radially outward plate and the annular outer wall.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
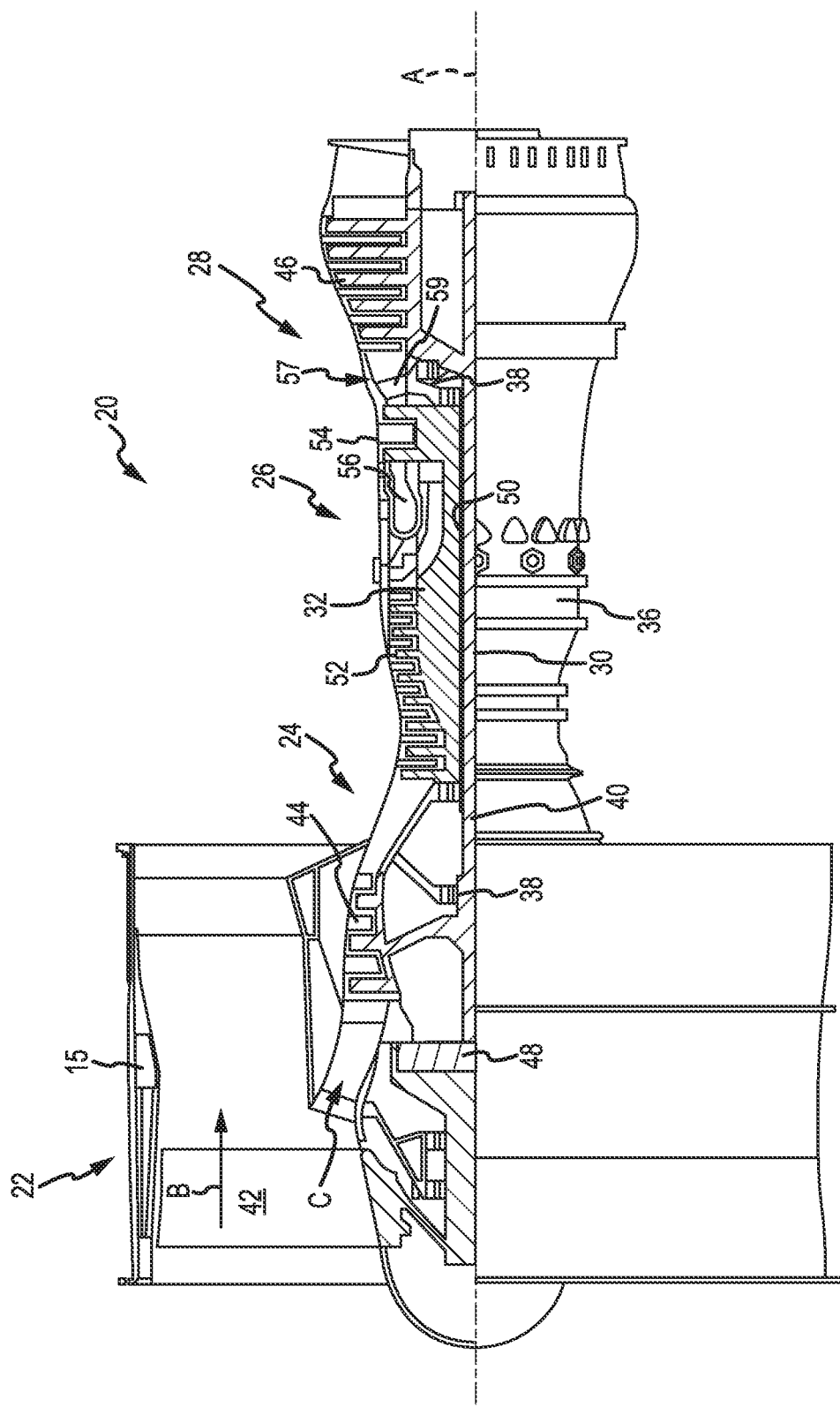
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the fan drive gear system 48.

During operation of the gas turbine engine 20, the air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
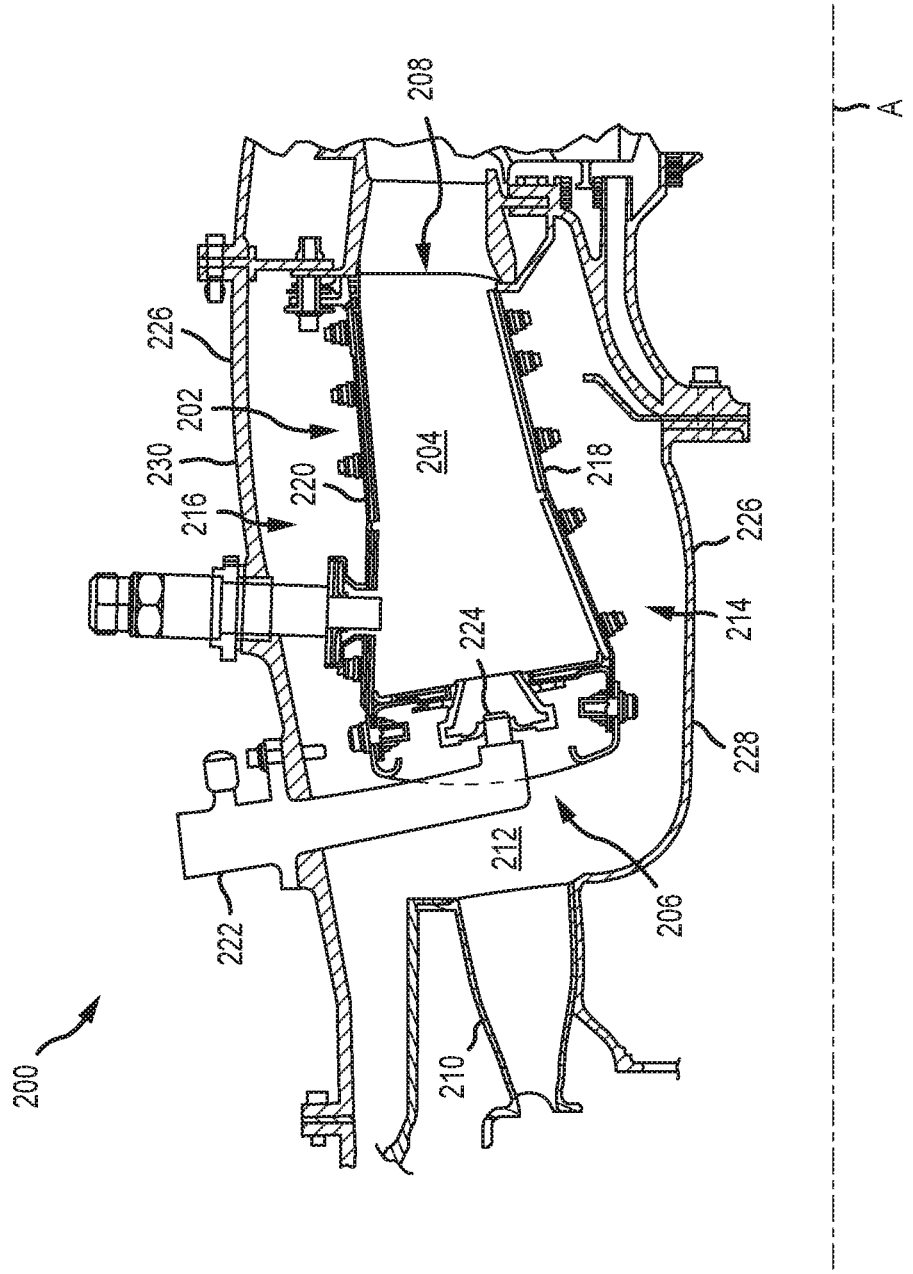
FIG. 2 is a cross sectional schematic view of a diffuser-combustor assembly of a gas turbine engine, in accordance with various embodiments.

Referring now to FIG. 2, a diffuser-combustor assembly 200 is illustrated schematically. In various embodiments, the diffuser-combustor assembly 200 includes a combustor 202, such as, for example, the combustor 56 described above with reference to FIG. 1. As illustrated, the combustor 202 defines a combustion chamber 204 internal to the combustor 202. The combustor 202 includes a combustor inlet 206, leading compressed air from a compressor to the combustion chamber 204, and a combustor outlet 208, leading a combusted fuel/air mixture from the combustion chamber 204 to a turbine. In various embodiments, the compressor and turbine just referred to comprise the compressor section 24 and the turbine section 28, respectively, described above with reference to FIG. 1. A pre-diffuser 210 is disposed upstream of the combustor inlet 206 and configured to supply compressed air into a shroud cavity 212. Compressed air from a compressor section, such as, for example, the compressor section 24 described above with reference to FIG. 1, may then flow into the shroud cavity 212, which includes an inner diameter branch 214 and an outer diameter branch 216. The air from the inner diameter branch 214 and the outer diameter branch 216 may then enter the combustion chamber 204 through one or more apertures extending through an inner combustor panel 218 and an outer combustor panel 220, as well as through the combustor inlet 206. At the same time, fuel may be supplied into the combustion chamber 204 from a fuel injector 222 and a pilot nozzle 224. The fuel and air is mixed within the combustion chamber 204 and ignited to produce a high-temperature combusted fuel/air product mixture. The combusted fuel/air product mixture then exits the combustion chamber 204 through the combustor outlet 208, which is positioned upstream from a turbine section, such as the turbine section 28 described above with reference to FIG. 1. In various embodiments, the diffuser-combustor assembly 200 is surrounded by a shroud case 226. The shroud case 226 may comprise a radially inner portion that defines an inner diffuser case 228 and a radially outer portion that defines an outer diffuser case 230. As illustrated, the combustor 202 is positioned and secured between the inner diffuser case 228 and the outer diffuser case 230.

Figure 3:
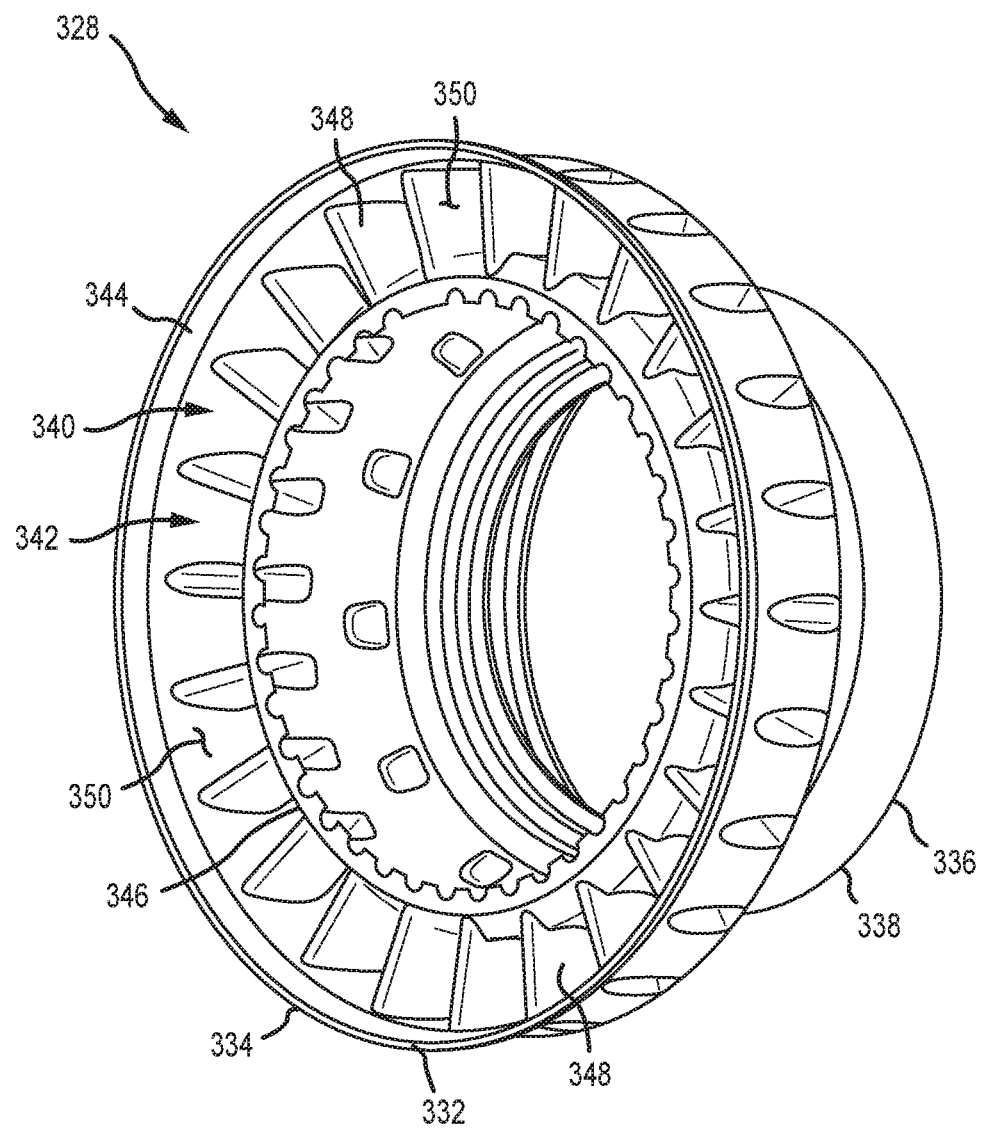
FIG. 3 is a perspective schematic view of a diffuser inner case, in accordance with various embodiments.

Referring now to FIG. 3, an inner diffuser case 328, such as, for example, the inner diffuser case 228 described above with reference to FIG. 2, is depicted. In various embodiments, the inner diffuser case 328 may include a forward flange 332 having a circular shape located at a forward end 334 and configured for being secured to an aft end of a high pressure compressor, such as, for example, the high pressure compressor 52 described above with reference to FIG. 1. The inner diffuser case 328 may similarly include an aft flange 336 having a circular shape located at an aft end 338 and configured for being secured to a forward end of a high pressure turbine, such as, for example, the high pressure turbine 54 described above with reference to FIG. 1.

The inner diffuser case 328 may further include a pre-diffuser section 340 extending circumferentially about the inner diffuser case 328 and longitudinally from proximate the forward end 334 toward the aft end 338. In various embodiments, the pre-diffuser section 340 includes a passageway 342 that also extends circumferentially about the inner diffuser case 328 and longitudinally from proximate the forward end 334 toward the aft end 338. In various embodiments, the passageway 342 may be defined by an annular outer wall 344 and an annular inner wall 346 disposed radially inward of the annular outer wall 344. A plurality of struts 348, extending radially between the annular outer wall 344 and the annular inner wall 346, may be positioned at circumferentially spaced intervals about the passageway 342. The annular outer wall 344, the annular inner wall 346 and the plurality of struts 348 define a plurality of passageways 350 extending axially through the pre-diffuser section 340.

Figure 4A:
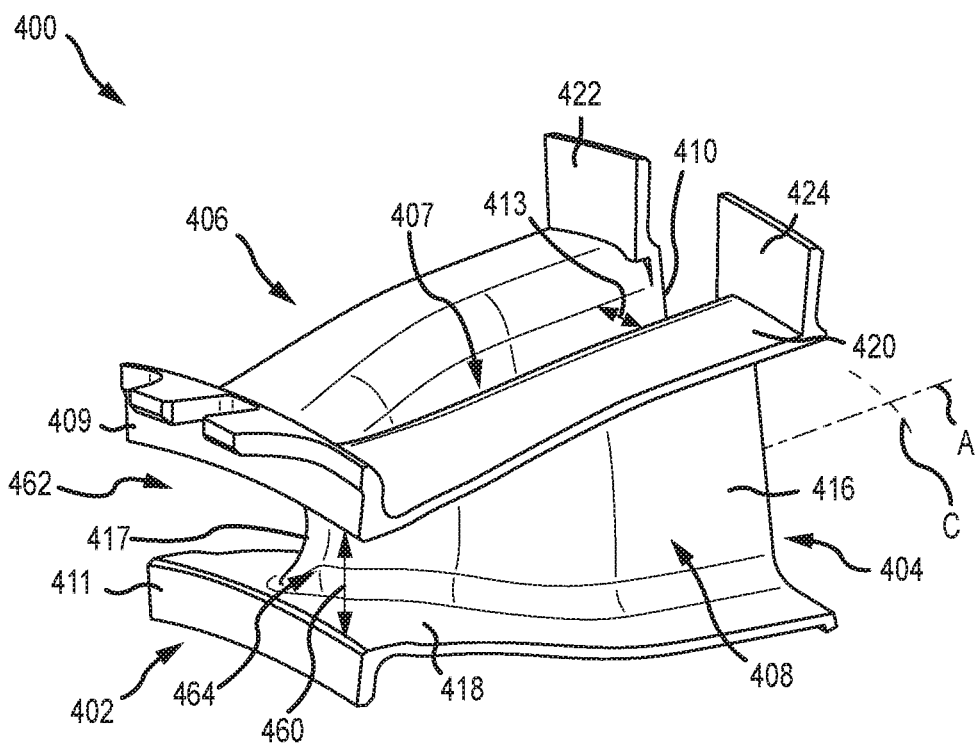
FIGS. 4A and 4B are perspective schematic views of a pre-diffuser fairing, in accordance with various embodiments.
Figure 4B:
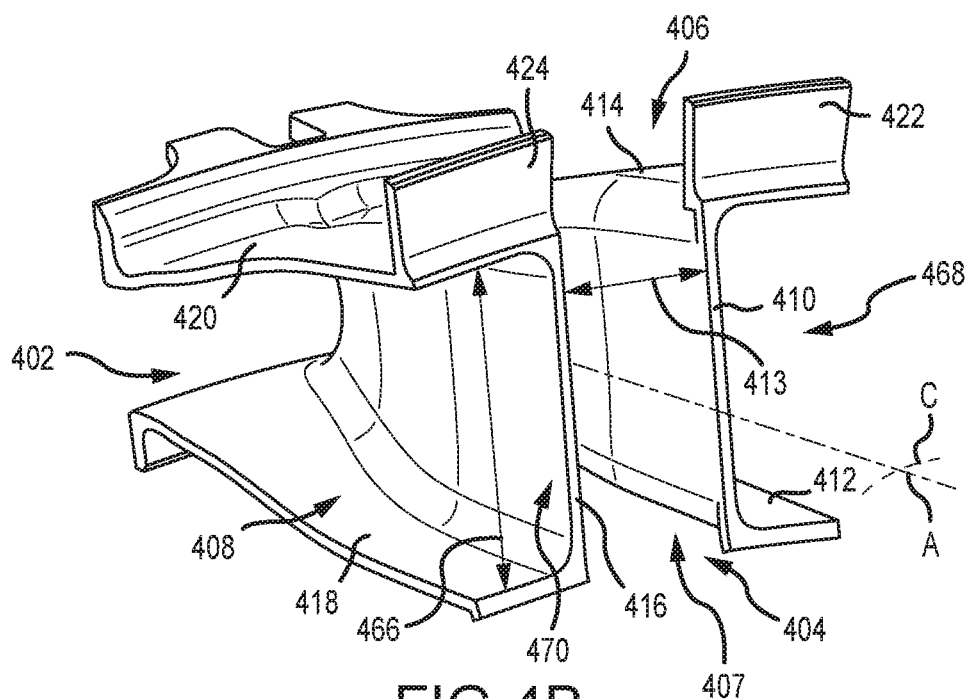

Referring now to FIGS. 4A and 4B, a pre-diffuser fairing 400 is illustrated, in accordance with various embodiments. In general, the pre-diffuser fairing 400 is one of a plurality of such fairings that extend circumferentially about a pre-diffuser section of an inner diffuser case, such as, for example, the pre-diffuser section 340 of the inner diffuser case 328 described above with reference to FIG. 3. Each pre-diffuser fairing 400 may be defined with respect to a longitudinal axis A that runs between a fore end 402 and an aft end 404 of each fairing. In various embodiments, each pre-diffuser fairing 400 includes a first portion 406 (or first fairing half) and a second portion 408 (or second fairing half). The first portion 406 includes a first side wall 410, a first radially inward plate 412 (or first radially inward portion) and a first radially outward plate 414 (or first radially outward portion). Similarly, the second portion 408 includes a second side wall 416, a second radially inward plate 418 (or second radially inward portion) and a second radially outward plate 420 (or second radially outward portion). As discussed further below, in various embodiments, the first side wall 410 and the second side wall 416 are spaced in a circumferential direction C to form a cavity 407, extending lengthwise along the longitudinal axis A between the first portion 406 and the second portion 408, that is configured to receive a strut, such as, for example, one of the plurality of struts 348 described above with reference to FIG. 3. In various embodiments, the cavity 407 defines a width 413 that may vary in size along a lengthwise dimension (e.g., along the longitudinal axis A) of the cavity 407 in order to accommodate, for example, a strut having a variable lengthwise dimension. Furthermore, while the first portion 406 and the second portion 408 are described above as comprising radially outward and radially inward plates and side walls, it will be appreciated that these components may be formed in blended or continuous fashion, such that the radially outward plate, the radially inward plate and the side wall of either portion (or fairing half) or both portions (or fairing halves) may comprise a smooth continuous surface or flow path without clear demarcation of the individual components. Thus, in various embodiments, the radially inward and outward plates of the fairings are more aptly referred to as radially inward and outward portions of the fairings having interior or exterior curved sections that blend into the corresponding side walls.

In various embodiments, the first radially inward plate 412 and the second radially inward plate 418 are spaced apart in a radial direction by an entrance distance 460, respectively, from the first radially outward plate 414 and the second radially outward plate 420 and define a first entrance opening 462 and a second entrance opening 464 at the fore end 402. Hot, compressed air from the compressor enters the first entrance opening 462 and the second entrance opening 464 and is diverted at a leading edge portion 417 to flow along the first portion 406 and the second portion 408. Similarly, in various embodiments, the first radially inward plate 412 and the second radially inward plate 418 are spaced apart in a radial direction by an exit distance 466, respectively, from the first radially outward plate 414 and the second radially outward plate 420 and define a first exit opening 468 and a second exit opening 470 at the aft end 404. When placed adjacent one another, a first portion of a first pre-diffuser fairing and a second portion of a second pre-diffuser fairing will define a pre-diffuser passageway extending from adjacently positioned entrance portions and exit portions, the pre-diffuser passageway bounded by the adjacently positioned radially inward plates, radially outward plates and side walls, as described above. In various embodiments, the exit distance 466 is greater in magnitude than the entrance distance 460, providing the pre-diffuser passageway with characteristics of a diffuser, reducing the velocity and increasing the pressure of the flow of air as it traverses the passageway from the entrance to the exit.

In various embodiments, the first portion 406 and the second portion 408 of the pre-diffuser fairing 400 further include, respectively, a first aft end stop 422 and a second aft end stop 424, configured for attachment to a lip (shown, for example, in FIGS. 5A and 5B) extending radially inward from an aft end of an annular outer wall of an inner diffuser case, such as, for example, the annular outer wall 344 of the inner diffuser case 328, described above with reference to FIG. 3. Additionally, a radially outward lip 409 (extending substantially radially outward from one or both of the first radially outward plate 414 and the second radially outward plate 420) and a radially inward lip 411 (extending substantially radially inward from one or both of the first radially inward plate 412 and the second radially inward plate 418) are configured for engagement with an aft end of a compressor section, such as, for example, the compressor section 24 described above with reference to FIG. 1 and serve to urge the first aft end stop 422 and the second aft end stop 424 into abutting position against the lip (shown in FIGS. 5A and 5B) extending radially inward from the aft end of the annular outer wall of the inner diffuser case. As described further below, in various embodiments, the first side wall 410 and the second side wall 416 are configured to straddle a strut, such as, for example, one of the plurality of struts 348 described above with reference to FIG. 3.

Figure 5A:
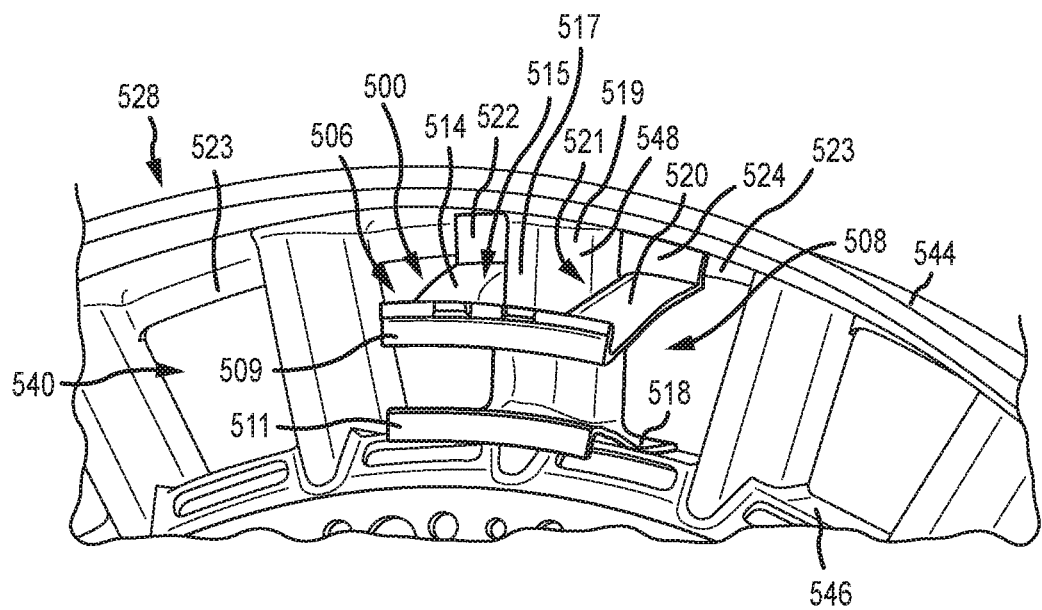
FIGS. 5A and 5B are perspective schematic views of a pre-diffuser fairing positioned within the pre-diffuser section of a diffuser inner case.
Figure 5B:
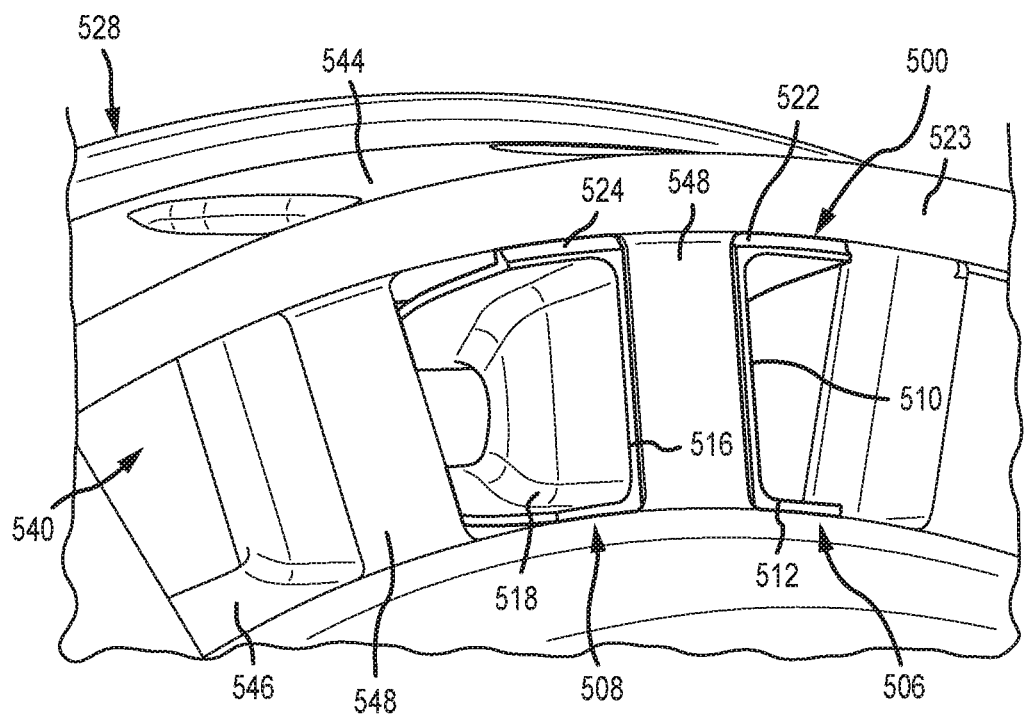
Figure 5C:
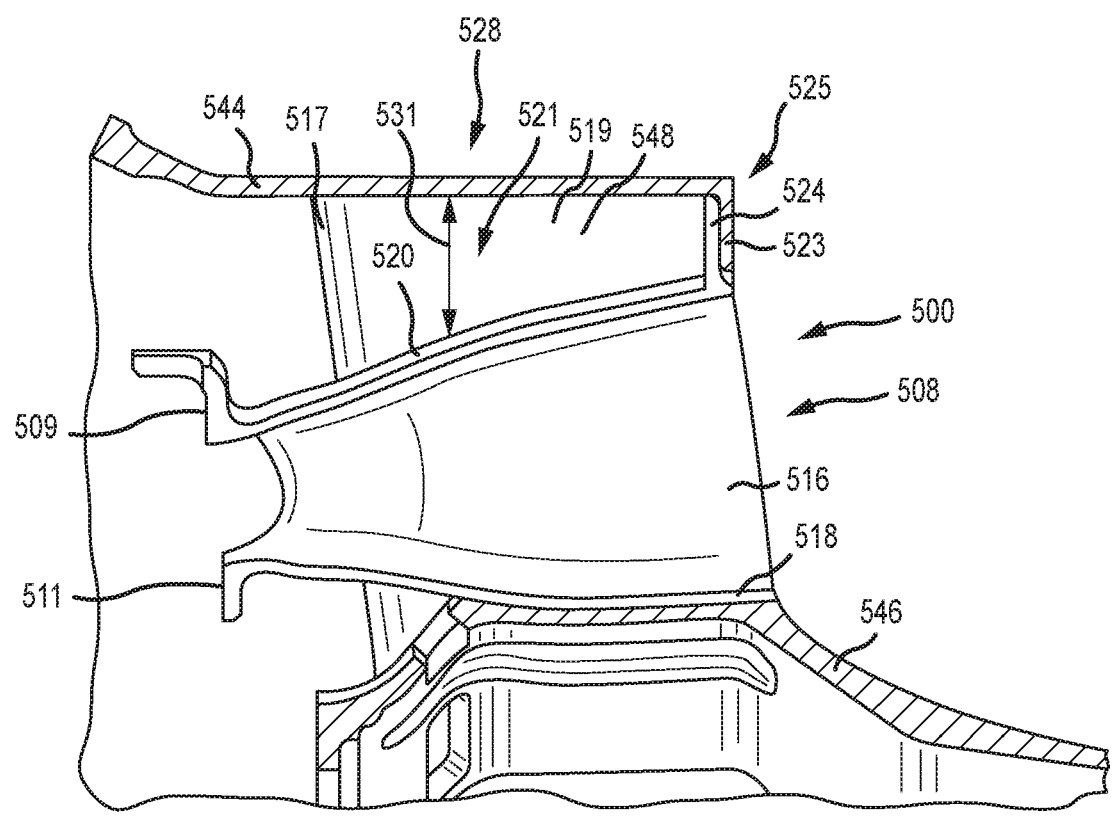
FIG. 5C is a side schematic view of the pre-diffuser fairing positioned within the diffuser inner case illustrated in FIGS. 5A and 5B.

Turning now to FIGS. 5A, 5B and 5C, a pre-diffuser fairing 500, positioned within a pre-diffuser section 540 of an inner diffuser case 528, is illustrated. Similar to the pre-diffuser fairing 400 described above with reference to FIG. 4, the pre-diffuser fairing 500 includes a first portion 506 and a second portion 508. The pre-diffuser fairing 500 includes a first side wall 510 and a second side wall 516 configured to straddle one of a plurality of struts 548 extending radially between an annular outer wall 544 and an annular inner wall 546 of the inner diffuser case 528. When assembled with the inner diffuser case 528, the pre-diffuser fairing 500 includes a first aft end stop 522 and a second aft end stop 524 that are configured for attachment to a lip 523 extending radially inward from an aft end 525 (see FIG. 5C) of the annular outer wall 544 of the inner diffuser case 528. A radially outward lip 509 and a radially inward lip 511 are configured for engagement with an aft end of a compressor section, such as, for example, the compressor section 24 described above with reference to FIG. 1 and serve to urge the first aft end stop 522 and the second aft end stop 524 into position against the lip 523 extending radially inward from the aft end 525 of the annular outer wall 544 of the inner diffuser case 528. A first radially inward plate 512 of the first portion 506 and a second radially inward plate 518 of the second portion 508 are positioned adjacent the annular inner wall 546 of the inner diffuser case 528. In various embodiments, the first radially inward plate 512 and the second radially inward plate are positioned to be in direct contact with the annular inner wall 546 of the inner diffuser case 528.

Similar to the pre-diffuser fairing 400 described above with reference to FIG. 4, the first portion 506 of the pre-diffuser fairing 500 also includes a first radially outward plate 514 and the second portion 508 of the pre-diffuser fairing 500 includes a second radially outward plate 520. In various embodiments, the first radially outward plate 514 and the second radially outward plate 520 are positioned radially inward of the annular outer wall 544, defining an offset distance 531, such that a first cavity 515 is formed between the annular outer wall 544 and the first radially outward plate 514 and a second cavity 521 is formed between the annular outer wall 544 and the second radially outward plate 520. The first cavity 515 and the second cavity 521 provide an insulating region between the first radially outward plate 514 and the second radially outward plate 520, which are typically at an elevated temperature due to the passage of the hot, compressed air exiting the compressor, and the annular outer wall 544, which is typically at a cooler temperature due to the presence of cooler air external to the annular outer wall 544. The insulating effect of the first cavity 515 and the second cavity 521 provide for reduced thermal stresses within each of the plurality of struts 548 straddled by a pre-diffuser fairing 500, the configurations of such being described above. In various embodiments, the offset distance 531 varies in size, in a radial direction, moving longitudinally between the radially outward lip 509 and the first aft end stop 522 on the first portion 506 and the second aft end stop 524 on the second portion 508. In various embodiments, the longitudinal variation in the offset distance 531 facilitates shaping of the pre-diffuser fairing 500 such that desired flow characteristics are achieved.

In various embodiments, the pre-diffuser fairing 500 (or a plurality of such fairings) also provides a thermal barrier between the hot, compressed air exiting the compressor and the plurality of struts 548 and the annular inner wall 546. For example, as illustrated in FIGS. 5A, 5B and 5C, the pre-diffuser fairing 500 may, in various embodiments, be configured to surround and make contact with a leading edge portion 517 and side portions 519 of each of the plurality of struts 548. Thus, instead of being exposed directly to the hot, compressed air exiting the compressor, each of the plurality of struts 548 and the annular inner wall 546 are shielded by the pre-diffuser fairing 500 (or a plurality of such fairings). For example, in various embodiments, the pre-diffuser fairing 500 may be constructed of materials comprising carbon composites, ceramics or aluminum or combinations thereof, that are designed to absorb the heat of the hot, compressed air exiting the compressor, thereby providing for further reduced thermal stresses within the plurality of struts 548 and the annular inner wall 546.

Figure 6A:
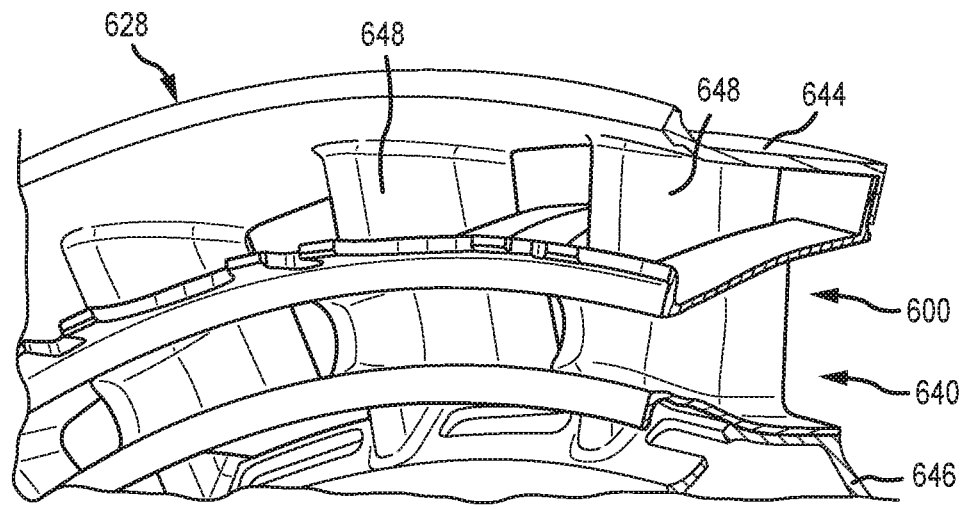
FIGS. 6A and 6B are perspective schematic views of a series of pre-diffuser fairings positioned within the pre-diffuser section of a diffuser inner case.
Figure 6B:
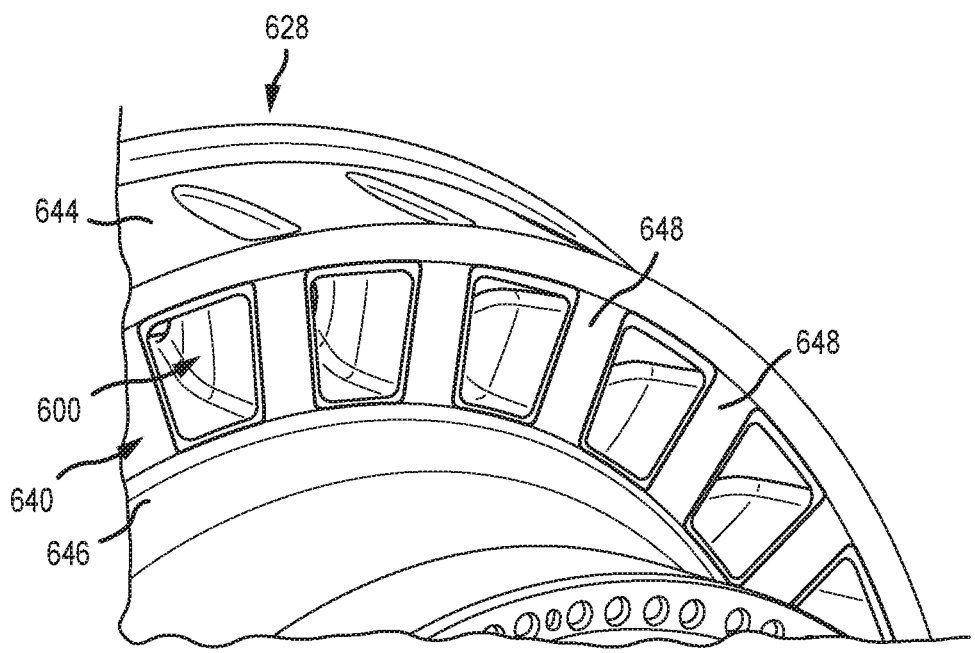

Referring now to FIGS. 6A and 6B, a pre-diffuser fairing 600, positioned within a pre-diffuser section 640 of an inner diffuser case 628, is illustrated. In various embodiments, the pre-diffuser fairing 600 shares the same or similar characteristics of the pre-diffuser fairing 400 described above with reference to FIG. 4 and the pre-diffuser fairing 500 described above with reference to FIGS. 5A, 5B and 5C, and such similar characteristics are therefore not repeated here. In various embodiments, however, the pre-diffuser fairing 600 may be constructed as a single, unitary, monolithic component, such that a single pre-diffuser fairing 600 may be configured to straddle two or more struts of a plurality of struts 648 extending radially between an annular outer wall 644 and an annular inner wall 646 of the inner diffuser case

628. In various embodiments, the pre-diffuser section 640 in its entirety may be fit with a single, unitary, monolithic component, such that a single pre-diffuser fairing 600 may be configured to straddle each one of the struts within the plurality of struts 648 extending radially between the annular outer wall 644 and the annular inner wall 646. In various embodiments, the pre-diffuser fairing 600 may comprise a plurality of pre-diffuser fairing components that are separated by a gap in the circumferential direction between a first portion of one pre-diffusion fairing component and a second portion of an adjacent pre-diffusion fairing component (e.g., the first portion 406 and the second portion 408 described above with reference to FIG. 4) to permit thermal expansion of the pre-diffuser fairing components in the circumferential direction and, at the same time, reduce internal hoop stresses the pre-diffuser fairing components may otherwise experience without the gap.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pre-diffuser fairing for a gas turbine engine, comprising:
   a first side wall, a first radially inward portion and a first radially outward portion; and
   a second side wall, a second radially inward portion and a second radially outward portion;
      wherein the first side wall and the second side wall are spaced apart to form a cavity configured to receive a strut.

2. The pre-diffuser fairing of claim 1, wherein the strut extends in a radial direction between an annular outer wall and an annular inner wall of an inner diffuser case.

3. The pre-diffuser fairing of claim 2, wherein the first radially outward portion and the second radially outward portion are configured for positioning at an offset distance from the annular outer wall.

4. The pre-diffuser fairing of claim 3, wherein the first side wall and the second side wall define a longitudinal axis and wherein the offset distance is variable along the longitudinal axis.

5. The pre-diffuser fairing of claim 1, wherein the first radially outward portion comprises a first aft end stop configured to abut against an inner diffuser case.

6. The pre-diffuser fairing of claim 5, wherein the first aft end stop is configured to abut against a lip extending radially inward from an annular outer wall of the inner diffuser case.

7. The pre-diffuser fairing of claim 6, wherein the second radially outward portion comprises a second aft end stop configured to abut against the lip extending radially inward from the annular outer wall of the inner diffuser case.

8. The pre-diffuser fairing of claim 7, wherein the first radially outward portion and the second radially outward portion comprise a radially outward lip positioned at a fore end of the pre-diffuser fairing.

9. The pre-diffuser fairing of claim 8, wherein the first radially inward portion and the second radially inward portion comprise a radially inward lip positioned at the fore end of the pre-diffuser fairing.

10. The pre-diffuser fairing of claim 9, wherein at least one of the radially inward lip and the radially outward lip is configured to engage a compressor section of the gas turbine engine.

11. A pre-diffuser section for a gas turbine engine, comprising:
    an inner diffuser case having an annular outer wall and an annular inner wall positioned radially inward of the annular outer wall; and
    a first pre-diffuser fairing disposed between the annular outer wall and the annular inner wall, the first pre-diffuser fairing comprising:

a first portion having a first side wall, a first radially inward plate and a first radially outward plate, and a second portion having a second side wall, a second radially inward plate and a second radially outward plate.

12. The pre-diffuser section of claim 11, wherein the inner diffuser case includes a first strut extending radially between the annular outer wall and the annular inner wall and wherein the first side wall and the second side wall are spaced apart to form a cavity configured to receive the first strut.

13. The pre-diffuser section of claim 12, wherein the first radially outward plate and the second radially outward plate are positioned at an offset distance from the annular outer wall.

14. The pre-diffuser section of claim 13, wherein the first portion and the second portion define a longitudinal axis and wherein the offset distance is variable along the longitudinal axis.

15. The pre-diffuser section of claim 14, further comprising a second strut positioned adjacent the first strut and a second pre-diffuser fairing positioned adjacent the first pre-diffuser fairing.

16. The pre-diffuser section of claim 15, wherein the first pre-diffuser fairing and the second pre-diffuser fairing are configured to provide a pre-diffuser passageway extending in a lengthwise direction between the first strut and the second strut.

17. The pre-diffuser section of claim 16, wherein the first pre-diffuser fairing and the second pre-diffuser fairing are formed as a single component.

18. The pre-diffuser section of claim 13, wherein the first portion comprises a first aft end stop configured to abut against the inner diffuser case and wherein the second portion comprises a second aft end stop configured to abut against the inner diffuser case.

19. The pre-diffuser section of claim 18, wherein the first radially inward plate and the second radially inward plate are positioned radially outward of and in contact with the annular inner wall.

20. A gas turbine engine, comprising:

a compressor;

an inner diffuser case positioned axially downstream of the compressor, the inner diffuser case having an annular outer wall, an annular inner wall positioned radially inward of the annular outer wall and a strut extending radially between the annular outer wall and the annular inner wall; and a pre-diffuser fairing disposed between the annular outer wall and the annular inner wall, the pre-diffuser fairing comprising:

a first portion having a first side wall, a first radially inward plate and a first radially outward plate, and a second portion having a second side wall, a second radially inward plate and a second radially outward plate, wherein the first side wall and the second side wall are spaced apart to form a cavity configured to receive the strut and wherein the first radially outward plate and the second radially outward plate are positioned at an offset distance from the annular outer wall and configured to provide a first insulating region between the first radially outward plate and the annular outer wall and a second insulating region between the second radially outward plate and the annular outer wall.

* * * * *